(12) United States Patent
Zhang et al.

(10) Patent No.: US 12,181,601 B2
(45) Date of Patent: Dec. 31, 2024

(54) CALIBRATION DEVICE

(71) Applicant: Autel Intelligent Technology Corp., Ltd., Shenzhen (CN)

(72) Inventors: Kaikai Zhang, Guangdong (CN); Lianjun Liu, Guangdong (CN); Biwang Lai, Guangdong (CN)

(73) Assignee: Autel Intelligent Technology Corp., Ltd., Shenzhen (CN)

( * ) Notice: Subject to any disclaimer, the term of this patent is extended or adjusted under 35 U.S.C. 154(b) by 522 days.

(21) Appl. No.: 17/535,552

(22) Filed: Nov. 24, 2021

(65) Prior Publication Data

US 2022/0082657 A1     Mar. 17, 2022

Related U.S. Application Data

(63) Continuation of application No. PCT/CN2020/099718, filed on Jul. 1, 2020.

(30) Foreign Application Priority Data

Jul. 5, 2019   (CN) .......................... 201910605790.9

(51) Int. Cl.
    *G01S 7/40*       (2006.01)
(52) U.S. Cl.
    CPC ..................................... *G01S 7/40* (2013.01)
(58) Field of Classification Search
    CPC ........ G01S 7/40; G01S 7/4026; G01S 13/931; G01S 7/4082; G01M 11/00; F16M 11/041; F16M 13/022
    See application file for complete search history.

(56) References Cited

U.S. PATENT DOCUMENTS

| | | | | |
|---|---|---|---|---|
| 10,323,936 | B2* | 6/2019 | Leikert | G01B 11/2755 |
| 10,921,426 | B2* | 2/2021 | Tang | G01S 7/4017 |
| 11,279,038 | B2* | 3/2022 | Chen | B25J 9/1692 |
| 2004/0246171 | A1 | 12/2004 | Orr et al. | |
| 2018/0075675 | A1* | 3/2018 | Kim | G01S 7/40 |

FOREIGN PATENT DOCUMENTS

| | | |
|---|---|---|
| CN | 107861110 A | 3/2018 |
| CN | 107966690 A | 4/2018 |
| CN | 207689659 U | 8/2018 |
| CN | 109932693 A | 6/2019 |

* cited by examiner

*Primary Examiner* — An H Do
(74) *Attorney, Agent, or Firm* — Andrew C. Cheng

(57) ABSTRACT

A calibration device is provided. The calibration device includes a laser assembly, a calibration bracket and a magnetic element. The calibration bracket includes a loading platform which is configured to support the laser assembly. The magnetic element is mounted on one of the laser assembly and the loading platform, and is configured to attract the other of the laser assembly and the loading platform. By means of arranging the magnetic element on one of the loading platform and the laser assembly, the magnetic element can attract the other of the loading platform and the laser assembly, so that when the laser assembly needs to be mounted on the loading platform, the laser assembly only needs to approach the loading platform and the laser assembly will be attracted to the loading platform due to the magnetic force provided by the magnetic element.

19 Claims, 9 Drawing Sheets

CALIBRATION DEVICE

CROSS-REFERENCE OF RELATED APPLICATIONS

This application is a continuation application of International Application No. PCT/CN2020/099718, filed on Jul. 1, 2020, which claims priority to Chinese Patent Application No. 201910605790.9, entitled "CALIBRATION DEVICE", filed on Jul. 5, 2019 in China Patent Office, the entire contents of which are incorporated herein by reference.

TECHNICAL FIELD

The present application relates to the technical fields of automobile maintenance and device calibration, and in particular, to a calibration device.

RELATED ART

Advanced Driver Assistant System, simply ADAS, is an active safety technology that uses a variety of sensors installed on the vehicle to collect environmental data inside and outside the vehicle at the first time, and performs processes such as static and dynamic object identification, detection and tracking, so as to enable the driver to detect the possible dangers in the shortest time, thereby attracting their attentions and improving the safety. ADAS uses sensors such as cameras, radars, lasers, and ultrasonics to detect light, heat, pressure, or other variables used to monitor the condition of the vehicle, typically in front and rear bumpers, side mirrors, steering column, or windshields of the vehicle. Early ADAS technology was mainly based on passive alarms. When it is detected that the vehicle is in a potential danger, an alarm will be issued to remind the driver to pay attention to abnormal vehicle or road conditions.

In calibration of an ADAS of a vehicle to be calibrated, firstly the position of a radar on the vehicle to be calibrated is determined by a laser on the calibration bracket, then the laser is replaced by a radar calibration board, and the radar is calibrated with the radar calibration board. At present, the laser is fixed on the calibration bracket by screws, which makes the attachment and detachment of the laser inconvenient.

SUMMARY OF THE DISCLOSURE

In order to solve the above technical problem, an embodiment of the disclosure provides a calibration device, which makes detachment of a laser assembly and a calibration bracket convenient.

In order to solve the above technical problem, an embodiment of the disclosure provides the following technical solution:

A calibration device is provided. The calibration device includes: a laser assembly, a calibration bracket and a magnetic element. The calibration bracket includes a loading platform which is configured to support the laser assembly; The magnetic element is mounted on one of the laser assembly and the loading platform, and is configured to attract the other of the laser assembly and the loading platform.

In some embodiments, the calibration bracket further includes a pole, the pole being configured to support the loading platform.

In some embodiments, the pole passes through the loading platform, and the loading platform is movable along a length direction of the pole.

In some embodiments, the loading platform is provided with a mounting surface for attracting the laser assembly.

In some embodiments, the mounting surface is substantially parallel to the pole.

In some embodiments, the loading platform is provided with a mounting groove, and the mounting surface is located in the mounting groove.

In some embodiments, a positioning column is projected from the mounting surface, and the laser assembly is provided with a positioning hole; and the positioning column is received in the positioning hole when the laser assembly is attracted and received in the mounting surface.

In some embodiments, two mounting surfaces are provided, and the laser assembly is configured to be attracted to one of the two mounting surfaces.

In some embodiments, the calibration device further includes a protection chain having one end connected to the loading platform and the other end connected to the laser assembly.

In some embodiments, the laser assembly includes a fixing seat and a laser; the fixing seat being used to be attracted to the loading platform, and the laser being mounted to the fixing seat and used for emitting laser light.

In some embodiments, the fixing seat is provided with a mounting cylinder, one end of the laser is used for emitting laser light, and the other end of the laser is sleeved by the mounting cylinder.

In some embodiments, a switch of the laser is provided at the other end of the laser; and the switch is exposed on a surface of the fixing seat facing away from the mounting cylinder.

In some embodiments, the mounting cylinder is provided with a fastening screw penetrating therethrough in a radial direction to fix the other end of the laser to the mounting cylinder.

In some embodiments, the mounting cylinder is provided with a moving channel therein, and the moving channel has a channel bottom; the switch of the laser is provided at the other end of the laser, and the switch is a push button; and the other end of the laser passes through the the moving channel to be sleeved by the mounting cylinder, and the laser is movable along the moving channel so that the push button approaches or moves away from the channel bottom.

In some embodiments, the laser assembly further includes a resilient member for providing a resilient force to move the push button away from the the channel bottom.

In some embodiments, the resilient member is a compression spring; and two ends of the compression spring abut against the channel bottom and the other end of the laser, respectively.

In some embodiments, a bulge is projected from the channel bottom, and is aligned with the push button.

In some embodiments, the end of the compression spring abutting against the channel bottom sleeves the bulge.

In some embodiments, the moving channel is provided with an annular stop portion at an opening of the moving channel, the annular stop portion being smaller than the moving channel in cross-sectional dimension, and the moving channel sleeves the laser by means of the annular stop portion; and the other end of the laser is provided with an annular limit portion projected in a radical direction thereof, the annular limit portion being larger than the laser in cross-sectional dimension.

In some embodiments, the magnetic element is embedded in one of the laser or the loading platform.

In some embodiments, the magnetic element is bonded to one of the laser or the loading platform by means of back glue.

In some embodiments, one of the laser assembly and the loading platform is provided with the magnetic element, and the other of the loading platform and the laser assembly is provided with an attracting plate to be attracted by the magnetic element.

In some embodiments, the calibration device further includes a calibration element; and the calibration element and the laser are alternatively mounted on the loading platform.

In some embodiments, a surface of the loading platform substantially perpendicular to the pole and adjacent to the mounting surface is used for mounting the calibration element.

Compared with the prior art, in the calibration device provided by the embodiments of the disclosure, by means of arranging the magnetic element on one of the loading platform and the laser assembly, the magnetic element can attract the other of the loading platform and the laser assembly, so that when the laser assembly needs to be mounted on the loading platform, the laser assembly only needs to approach the loading platform and the laser assembly will be attracted to the loading platform due to the magnetic force provided by the magnetic element and, when the laser assembly needs to detach from the loading platform, the laser assembly only needs to be subjected to force to overcome the magnetic force provided by the magnetic element in order to separate the laser assembly from the loading platform, making detachment of the laser assembly and the calibration bracket convenient.

BRIEF DESCRIPTION OF THE DRAWINGS

One or more embodiments are illustrated by way of example in the accompanying drawings, and these illustrations are not to be construed as limiting the embodiments. Elements in the figures having the same reference numerals represent like elements, and unless otherwise specified, the figures in the accompanying drawings are not necessarily drawn to scale.

DETAILED DESCRIPTION OF THE DISCLOSURE

To facilitate understanding, the disclosure will be described in more detail below with reference to the accompanying drawings and specific embodiments. It should be noted that that when an element is referred to as being "secured" to another element, it may be directly on the other element or intervening elements may be present. When an element is referred to as being "connected" to another element, it may be directly connected to the other element or intervening elements may be present. The terms "vertical", "horizontal", "left", "right", "inner", "outer", and the like are used herein for descriptive purposes only.

Unless defined otherwise, all technical and scientific terms used herein have the same meaning as commonly understood by those of ordinary skill in the art to which this invention belongs. The terminology used herein is for the purpose of describing particular embodiments only and is not intended to be limiting of the invention. As used herein, the term "and/or" includes any and all combinations of one or more of the associated listed items.

Figure 1:
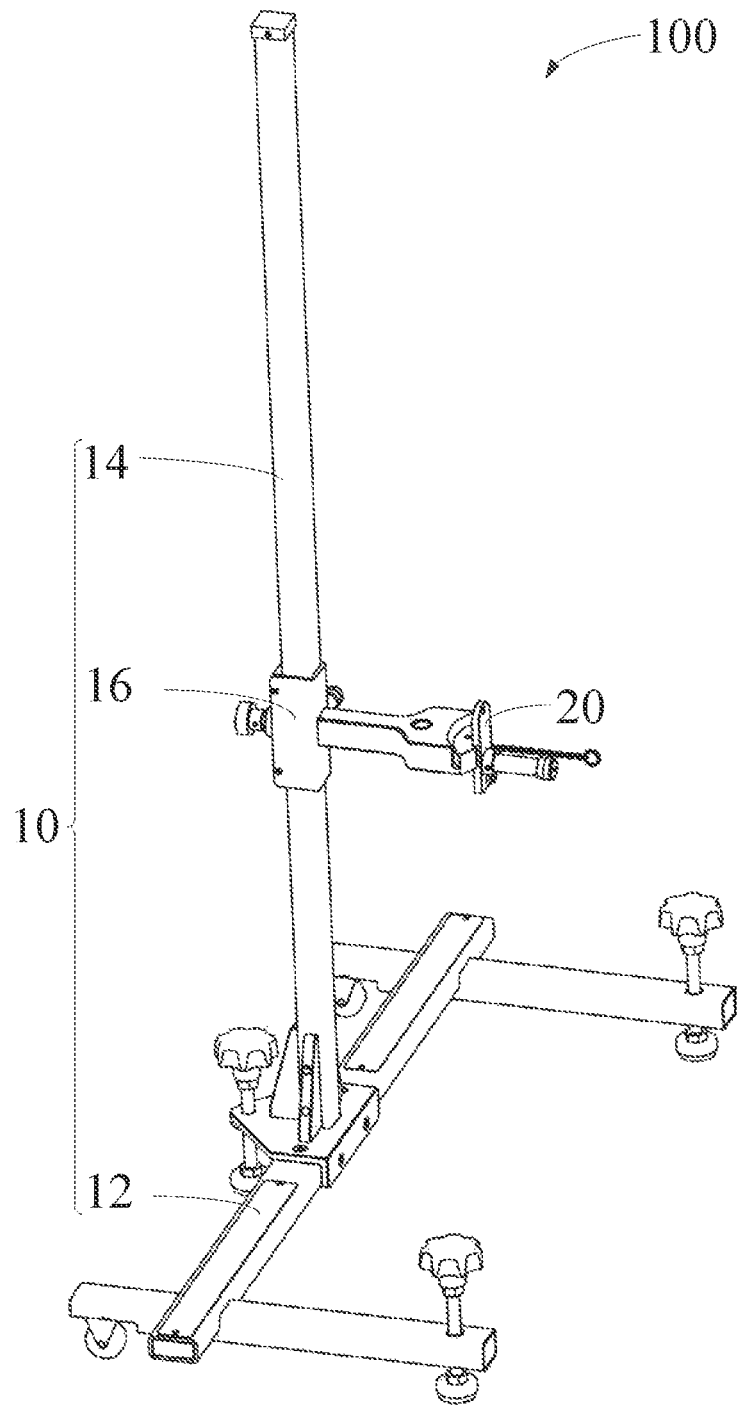
FIG. 1 shows a perspective view of a calibration device according to an embodiment of the disclosure, with a laser assembly mounted on a calibration bracket of the calibration device.
Figure 2:
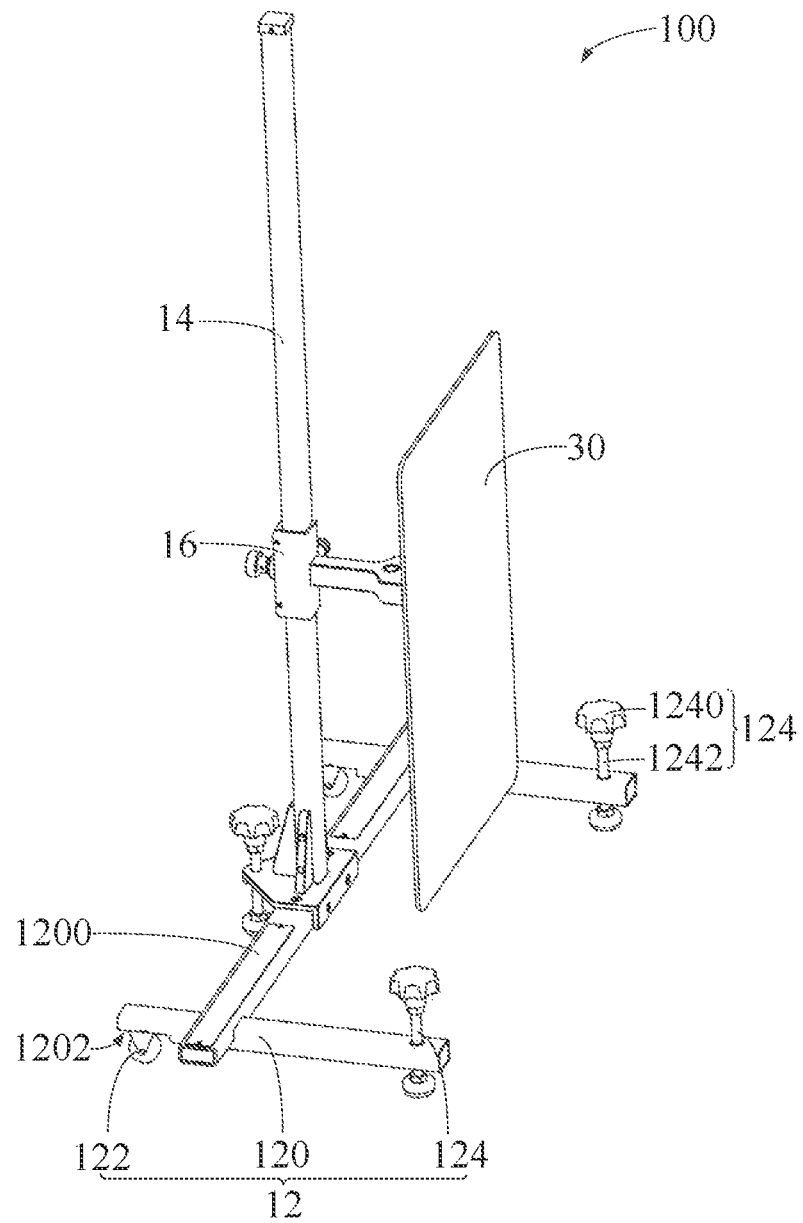
FIG. 2 shows a perspective view of the calibration device shown in FIG. 1, with the laser assembly replaced by a calibration element.

Referring to FIGS. 1 and 2, an embodiment of the disclosure provides a calibration device 100. The calibration device 100 includes a calibration bracket 10, a laser assembly 20 and a calibration element 30. The laser assembly 20 and the calibration element 30 may be alternatively connected to the calibration bracket 10

The calibration bracket 10 includes a base 12, a pole 14, and a loading platform 16.

The base 12 is configured to support the pole 14, and includes a base body 120, caster wheels 122, and horizontal adjusting members 124.

The base body 120 is substantially formed by three square bars assembled by welding, and has a horizontal I-shaped structure as a whole. The base body 120 has an upper surface 1200 and a lower surface 1202.

The caster wheels 122 are provided on the lower surface 1202 of the base body 120 to provide convenience for dragging the calibration bracket 10. Two caster wheels 122 are located at an edge of the base body 120, and according to practical situations, the number of the caster wheels 122 is not limited thereto, and may be 1, 3, 4, 5, etc. When the number of the caster wheels 122 is more than 2, all the caster wheels 122 should be in the same straight line.

The horizontal adjusting member 124 includes a handle 1240 and a screw 1242, the handle 1240 being fixedly mounted to one end of the screw 1242. The screw 1242 passes through the upper surface 1200 and the lower surface 1202, and is threadedly engaged with the base body 120, and the screw 1242 is vertically disposed. The handle 1240 is arranged above the upper surface 1200 for rotating the horizontal adjusting member 124 such that the horizontal adjusting member 124 moves in a vertical direction relative to the base body 120 for adjusting the pitch angle of the base body 120. Further, by moving the screw 1242 in the vertical direction relative to the base body 120 to an extent that the caster wheels 122 are suspended, the base body 120 is supported only by the horizontal adjusting members 124, and the base 12 is prevented from sliding sideways, which happens when the base body 120 is supported by the caster wheels 122. Three horizontal adjusting members 124 are triangularly arranged, in which a connecting line of two of the horizontal adjusting members 124 is substantially parallel to a connecting line of the two caster wheels 122, and the other horizontal adjusting member 124 is located between the two caster wheels 122.

One end of the pole 14 is fixedly mounted to the upper surface 1200, and the length direction of the pole 14 is perpendicular to the base body 120. The pole 14 is configured to support the loading platform 16.

Figure 3:
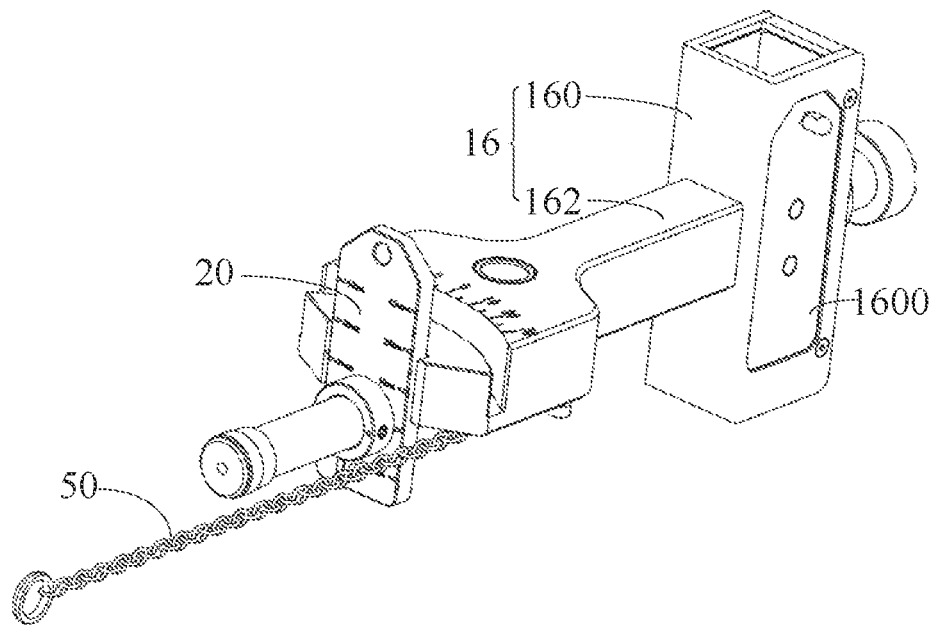
FIG. 3 shows a perspective view of a loading platform and the laser assembly of the calibration device shown in FIG. 1.
Figure 4:
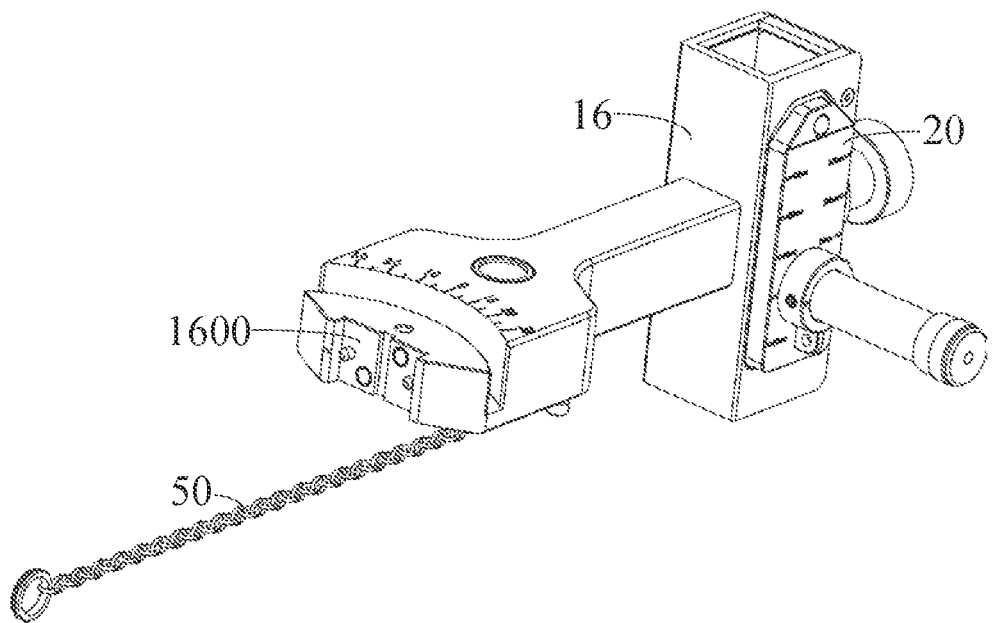
FIG. 4 shows a perspective view of the loading platform and the laser assembly of the calibration device shown in FIG. 3, with the laser assembly mounted in a different position.
Figure 5:
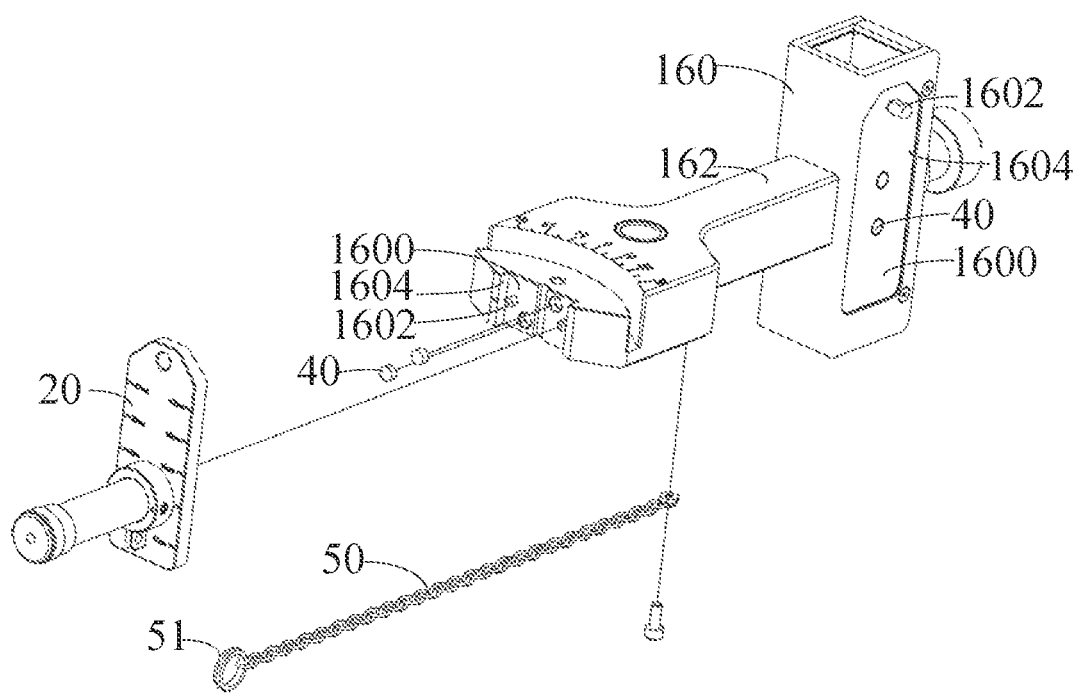
FIG. 5 shows a schematic view of the loading platform and the laser assembly of FIG. 3 disassembled.
Figure 6:
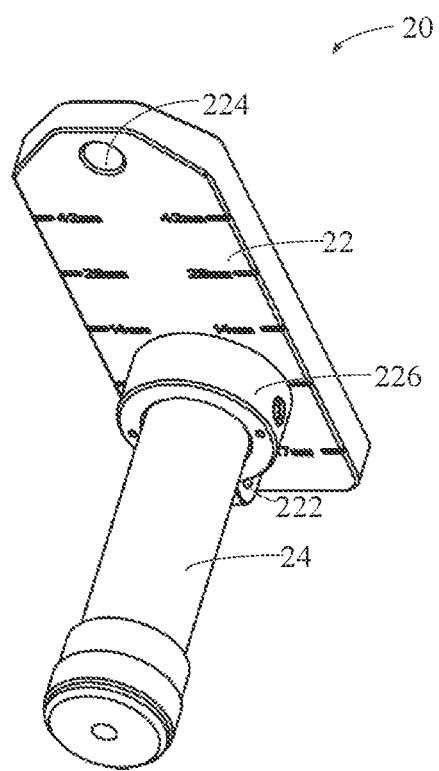
FIG. 6 shows a perspective view of the laser assembly shown in FIG. 3.
Figure 7:
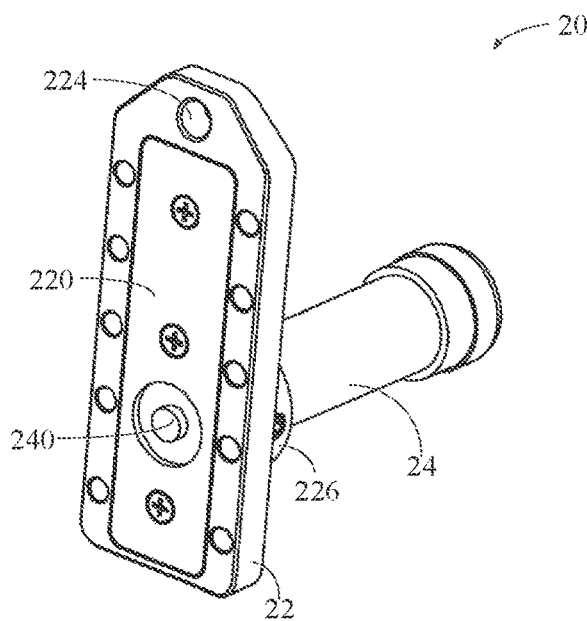
FIG. 7 shows a perspective view of of the laser assembly shown in FIG. 6 from another angle.
Figure 8:
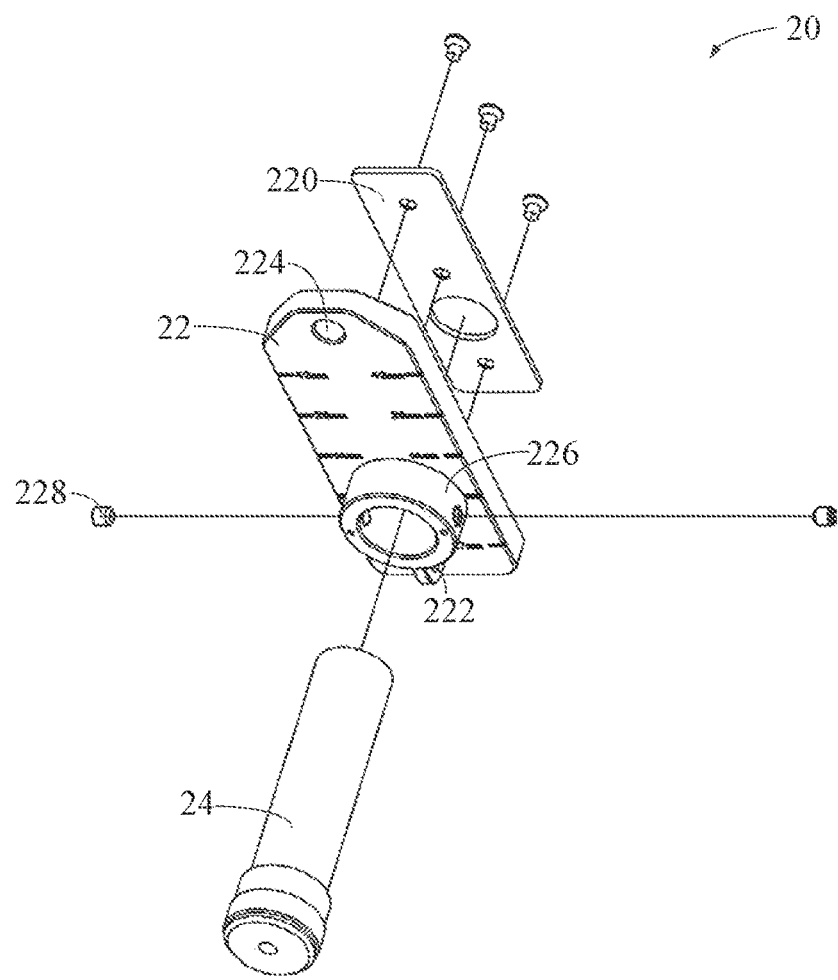
FIG. 8 shows a schematic view of the laser assembly shown in FIG. 6 disassembled.
Figure 9:
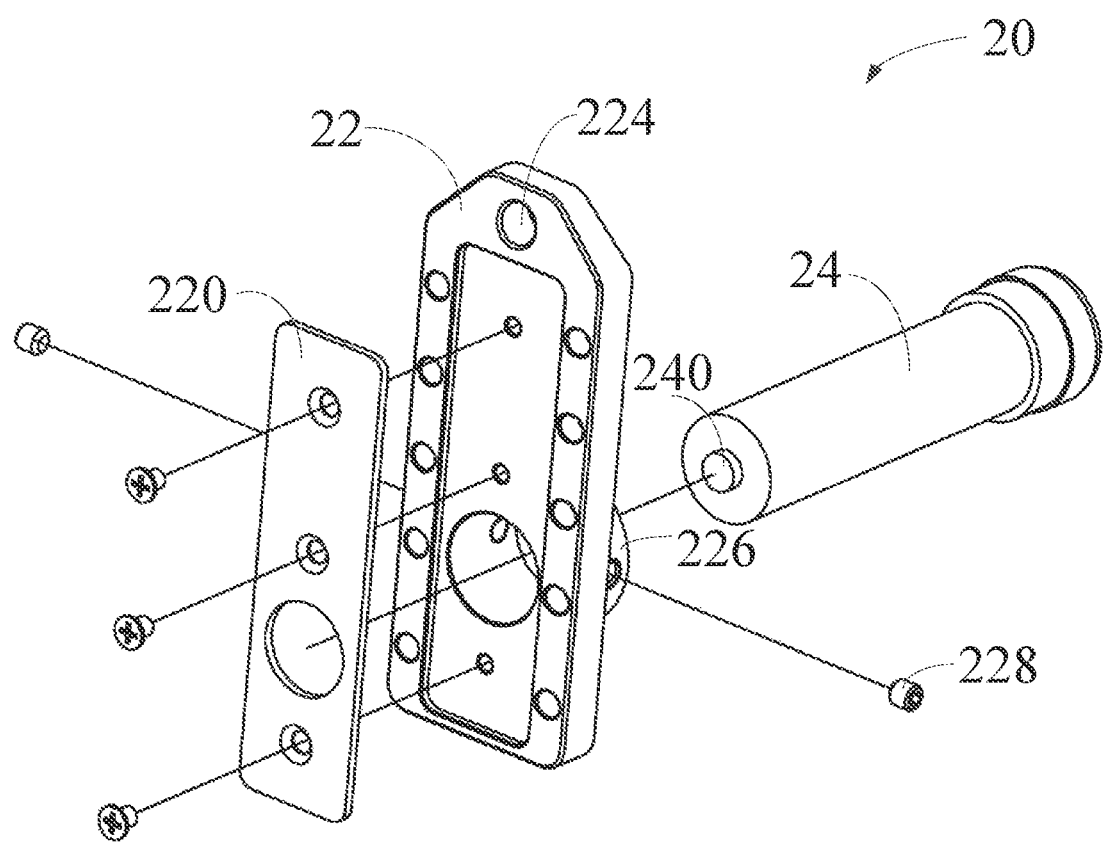
FIG. 9 shows a schematic view of the laser assembly shown in FIG. 8 disassembled from another angle.

Referring to FIGS. 3 to 5, the loading platform 16 is configured to support the laser assembly 20 and the calibration element 30. The loading platform 16 may support both the laser assembly 20 and the calibration element 30, or the loading platform may support one of the laser assembly 20 and the calibration element 30 separately.

The calibration device 100 further includes a magnetic element 40 disposed on the loading platform 16 for attracting the laser assembly 20. By means of the magnetic element 40, when the laser assembly 20 needs to be mounted on the loading platform 16, the laser assembly 20 only needs to approach the loading platform 16 and the laser assembly 20 will be attracted to the loading platform 16 due to the magnetic force provided by the magnetic element 40 and, when the laser assembly 20 needs to detach from the loading platform 16, the laser assembly 20 only needs to be subjected to force to overcome the magnetic force provided by the magnetic element 40 in order to separate the laser assembly 20 from the loading platform 16.

It will be appreciated that, depending on the actual conditions, the magnetic element 40 may also be provided on the laser assembly 20 for attracting the loading platform 16. That is, the magnetic element 40 is provided on one of the laser assembly 20 and the loading platform 16 and used for attracting the other of the laser assembly 20 and the loading platform 16.

Typically, the laser assembly is attached to the calibration device 100 to assist in positioning the calibration device relative to the vehicle. For example, the laser assembly emits a laser beam to measure the distance from the vehicle, or the laser assembly emits a laser beam to the vehicle and forms a laser line along the length of the vehicle. The calibration device 100 is adjusted so that the laser line is on the center plane of the vehicle, with the left and right parts of the vehicle being symmetrical relative to the center plane of the vehicle. Thus, the magnetic element is disposed on a front surface, facing the vehicle, of the loading platform, and as the front surface faces the vehicle, it is convenient to attach the laser assembly to the calibration element by means of the magnetic element 40, and the laser assembly emits a laser beam to assist in the positioning of the calibration element.

The magnetic element 40 has a short cylindrical shape and may be made of a permanent magnetic material, such as a permanent magnetic ferrite, an Al—Ni—Co permanent magnetic alloy, or an electromagnet, such as a field coil. The magnetic element 40 is embedded in the loading platform 16, and alternatively, the magnetic element 40 is bonded to the loading platform 16 by means of back glue. After the calibration device has been positioned, i.e. after the calibration device is in a pre-set position relative to the vehicle, generally, it needs to remove the laser and mount the calibration element on the loading platform to begin to calibrate related devices of the vehicle.

According to the embodiment of the disclosure, a mechanism for accommodating the laser assembly 20 is provided in the calibration device, so that the users can conveniently store or take out the laser assembly 20. The loading platform 16 is provided with a mounting surface 1600, and the magnetic element 40 is also provided on the mounting surface 1600, by which the laser assembly 20 is attracted to and received in the mounting surface 1600. The mounting surface 1600 is provided with two magnetic elements 40. In other embodiments, the mounting surface 1600 may be provided with more or less magnetic elements 40, for example, the number of magnetic elements 40 provided on the mounting surface 1600 may also be 1, 3, 4, 5, etc. In this way, when the laser assembly is in use, the laser assembly 20 is on the front surface of the loading platform, and the laser assembly 20 is replaced by the calibration element and switched into a storage state on the mounting surface. Among others, the mounting surface may be provided at the front end of the loading platform facing the vehicle, i.e., parallel to and spaced from the front surface, or the mounting surface may be provided at the rear end of the loading platform facing away from the vehicle or an adjacent surface adjacent to the front surface, or the mounting surface may be provided at other parts of the calibration bracket.

In some embodiments, the mounting surface 1600 is vertical, i.e., the mounting surface 1600 is parallel to the length direction of the pole 14, for hanging the laser assembly 20 on the mounting surface 1600. In other embodiments, the mounting surface 1600 may also be horizontal, i.e., the mounting surface 1600 is perpendicular to the length direction of the pole 14, for placing the laser assembly 20 on the mounting surface 1600.

In some embodiments, a positioning column 1602 is projected from the mounting surface 1600 for positioning with the laser assembly 20. In addition, in the case where the mounting surface 1600 is vertically disposed, the positioning column 1602 bears partial weight of the laser assembly 20, thereby further improving the reliability of the connection between the laser assembly 20 and the mounting surface 1600.

In some embodiments, the loading platform 16 is provided with a mounting groove 1604 in which the mounting surface 1600 is located, and the mounting groove 1604 matches with the laser assembly 20.

In some embodiments, the loading platform 16 is provided with two mounting surfaces 1600, and the laser assembly 20 may be attracted to any one of the mounting surfaces 1600. By providing two mounting surfaces 1600, after the laser assembly 20 is used, the laser assembly 20 may be attracted to any one of the mounting surfaces 1600 to prevent from getting lost, which is convenient for operation.

In some embodiments, the calibration device 100 further includes a protection chain 50 having one end connected to the loading platform 16 and the other end connected to the laser assembly 20. By providing the protection chain 50, it is ensured that the laser assembly 20 will not get lost, and at the same time, it is ensured that the laser assembly 20 is prevented from falling down and colliding with the ground to cause damages during the process of moving the laser assembly 20. One end of the protection chain 50 is fixed to the loading platform 16 by a screw, the other end of the protection chain 50 is provided with a connection ring 51, and the other end of the laser assembly 20 is connected to the other end of the protection chain 50 via the connection ring 51. The loading platform 16 includes a moving part 160 and a holding part 162.

The pole 14 passes through the moving part 160, and the moving part 160 is movable along a length direction of the pole 14 so as to adjust the height of the loading platform 16 from the ground.

Both the moving part 160 and the pole 14 are square in cross-section so that the moving part 160 only moves along the pole 14 and does not rotate about the pole 14. It will be appreciated that the cross-sections of the moving part 160 and the pole 14 may also be elliptical, triangular, pentagonal, etc., as long as the cross-sections of the moving part 160 and the pole 14 are non-circular, depending on the actual conditions.

The holding part 162 has a horizontal bar shape, one end of which is connected to the moving part 160, while the other end is configured to support the laser assembly 20 and the calibration element 30. One mounting surface 1600 is provided at the other end of the holding part 162, and the other mounting surface 1600 is provided on the moving part 160.

One mounting surface 1600 is provided at a surface of the holding part 162 facing away from the moving part 160. A surface of the holding part 162 perpendicular to the length direction of the pole 14 and adjacent to the mounting surface 1600 serves to support the calibration element 30.

The calibration element 30 may be a radar calibration board, a pattern calibration board, or the like. Since the calibration element is heavier than the laser assembly 20, the calibration element may be mounted to the loading platform 16 in other ways, such as by screws securing the calibration element 30 to the loading platform 16. Alternatively, the calibration element may be mounted in a manner of being movable relative to the loading platform 16, as shown in FIG. 3, the loading platform has an arcuate surface, and the calibration element is mounted on the loading platform in a manner of being movable on the arcuate surface. Furthermore, as shown in FIG. 3, the loading platform is marked with a scale on an adjacent upper surface of the arcuate surface to identify the angle of adjustment of the calibration element, thereby improving the accuracy of adjustment.

Referring to FIGS. 6 to 9, the laser assembly 20 includes a fixing seat 22 and a laser 24. The fixing seat 22 is configured to support the laser 24, and the whole fixing seat 22 is shaped like a plate and may be made of aluminum. A surface of the fixing seat 22 is provided with an attracting plate 220 to be attracted by the magnetic element 40, and the attracting plate 220 may be made of easily magnetized materials, such as iron, nickel, cobalt, etc.

It will be appreciated that, in some embodiments, the attracting plate 220 may be omitted, and the fixing seat 22 may also be attracted by the magnetic element 40 by being made of a material that is attractive to the magnetic element 40.

In some embodiments, the attracting plate 220 is embedded in the fixing seat 22 so that the attracting plate 220 does not protrude from the fixing seat 22, making the overall structure compact.

In some embodiments, the attracting plate 220 is fixed to the fixing seat 22 by screws, and it will be appreciated that the attracting plate 220 may be fixed to the fixing seat 22 by means of gluing, welding or the like.

In some embodiments, the fixing seat 22 is provided with a chain hole 222 for the connection ring 51 to pass through.

In some embodiments, the fixing seat 22 is provided with a positioning hole 224. The positioning column 1602 is received in the positioning hole 224 when the laser assembly 20 is attracted and received in the mounting surface 1600.

The other surface of the fixing seat 22 is provided with a surface scale made by laser engraving for measuring the relative position of the calibration bracket to a vehicle to be calibrated. A mounting cylinder 226 is projected from the other surface of the fixing seat 22 for sleeving the laser 24.

In some embodiments, The mounting cylinder 226 is provided with a fastening screw 228 penetrating therethrough in a radial direction to fix the laser 24 to the mounting cylinder 226.

The whole laser 24 has a long cylindrical shape, one end of the laser 24 is used for emitting a laser light beam, and the other end of the laser 24 is sleeved by the mounting cylinder 226. A switch of the laser 24 is provided at the other end of the laser 24, and the switch is a push button 240 which is exposed on a surface of the fixing seat 22 to be attracted to the loading platform 16.

Figure 10:
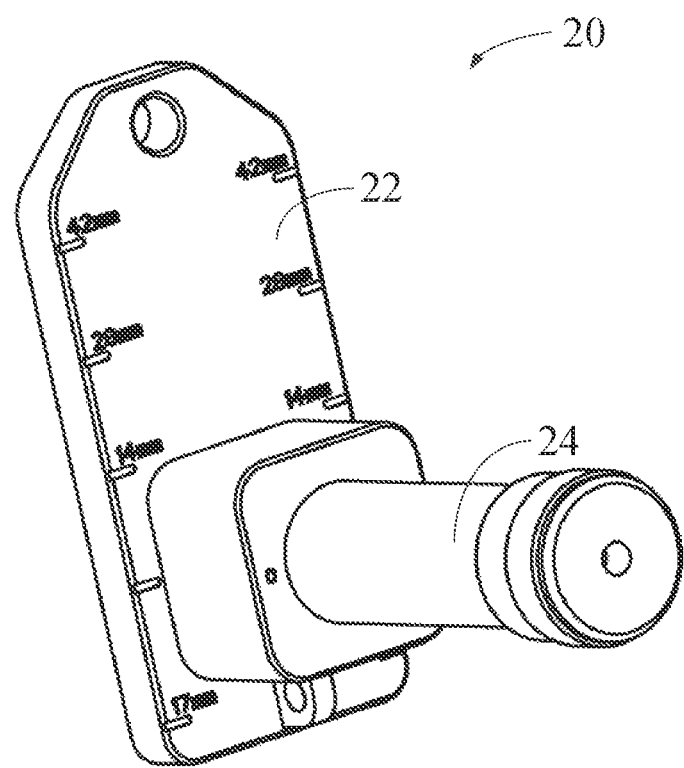
FIG. 10 shows a perspective view of a laser assembly of a calibration device according to another embodiment of the disclosure.
Figure 11:
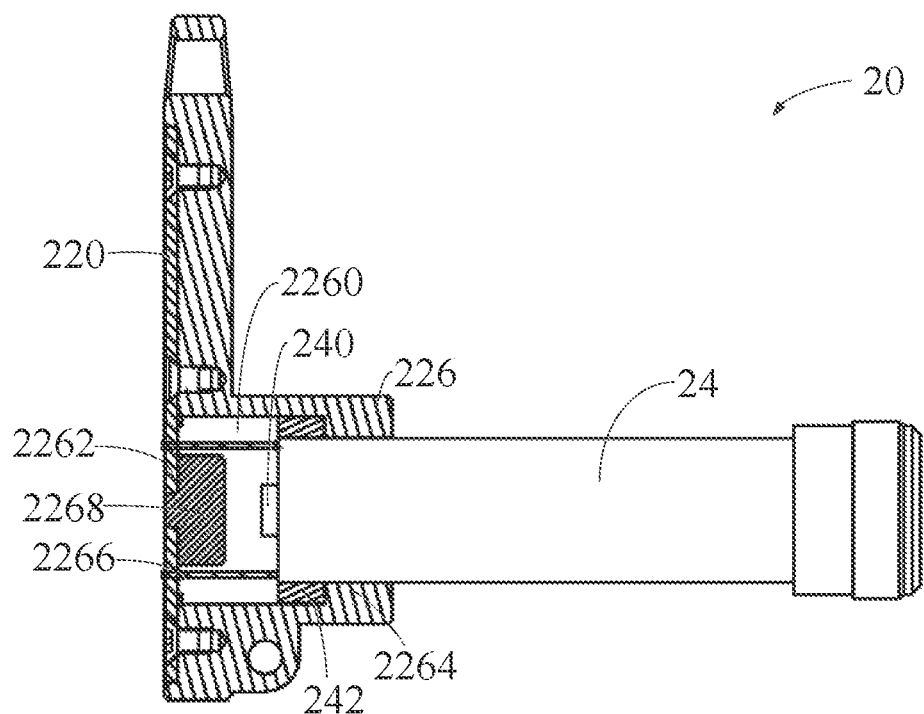
FIG. 11 shows a cross-sectional view of the laser assembly shown in FIG. 10.

Referring to FIGS. 10 and 11 together, when the laser 24 is to be turned on or off, the laser assembly 20 needs to be separated from the loading platform 16 to turn the laser 24 on or off. Another embodiment of the disclosure provides a calibration device in order to solve the problem of the embodiment described above that it is to cumbersome turn the laser 24 on or off.

The calibration device is substantially the same as the calibration device 100 of the embodiment described above, except that the fixing seat 22 is different.

The mounting cylinder 226 is provided with a moving channel 2260 therein, and the moving channel 2260 has a channel bottom 2262, the laser 24 passes through the the moving channel 2260 to be sleeved by the mounting cylinder 226, and the laser 24 is movable along the moving channel 2260 so that the push button 240 approaches or moves away from the channel bottom 2262 of the moving channel 2260. By providing the moving channel 2260 for the laser 24 to move, the push button 240 may be pushed by the channel bottom 2262 when approaching the channel bottom 2262 , thereby turning the laser 24 on or off.

In some embodiments, the moving channel 2260 is provided with an annular stop portion 2264 at an opening of the moving channel 2260, the annular stop portion 2264 being smaller than the moving channel 2260 in cross-sectional dimension, and the moving channel 2260 sleeves the laser 24 by means of the annular stop portion 2264. The other end, where the push button 240 is arranged, of the laser 24 is provided with an annular limit portion 242 projected in a radical direction thereof, the annular limit portion 242 being larger than the laser 24 in cross-sectional dimension. During movement of the laser 24, the annular limit portion 242 may abut the annular stop portion 2264 to prevent the laser 24 from leaving the moving channel 2260. The channel bottom 2262 is the attracting plate 220, and when the laser 24 is assembled with the fixing seat 22, the laser 24 firstly enters the moving channel 2260 from the side of the fixed seat 22 facing away from the mounting cylinder 226, and then the attracting plate 220 is mounted to the fixed seat 24 to close the moving channel 2260.

In some embodiments, the laser assembly 20 further includes a resilient member 2266 for providing a resilient force to move the push button 240 away from the the channel bottom 2262. When the push button 240 has been pressed by the channel bottom 2262, the resilient force provided by the resilient member 2266 returns the laser 24. The resilient member 2266 is a compression spring, and according to actual conditions, the resilient member 2266 may also have a resilient structure such as a torsion spring and a spring plate. The compression spring is located in the moving channel 2260, and both ends of the compression spring abut against the laser 24 and the channel bottom 2262, respectively.

In some embodiments, a bulge 2268 is projected from the channel bottom 2262, and is aligned with the push button 240, the bulge 2268 being used for pressing the push button 240. This reduces the travel of the laser 24 within the moving channel 2600. The end of the compression spring abutting against the channel bottom 2262 sleeves the bulge 2268, so as to position the compression spring.

Figure 12:
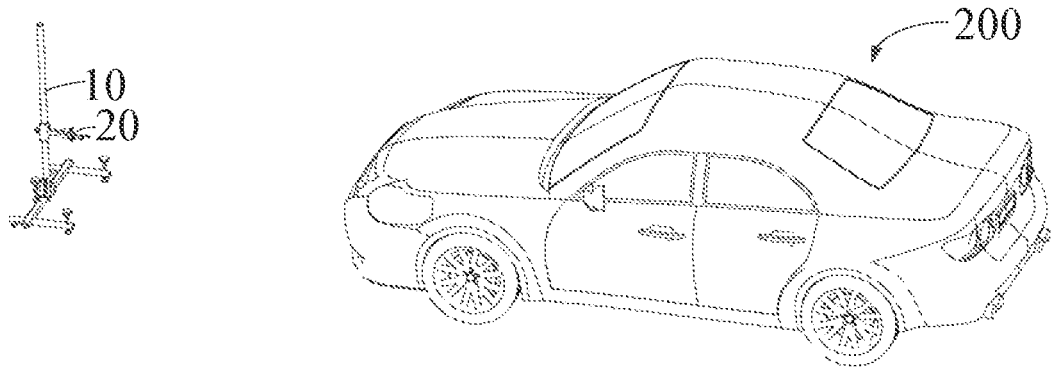
FIG. 12 shows a perspective view of the calibration device shown in FIG. 1 and a vehicle to be calibrated.
Figure 13:
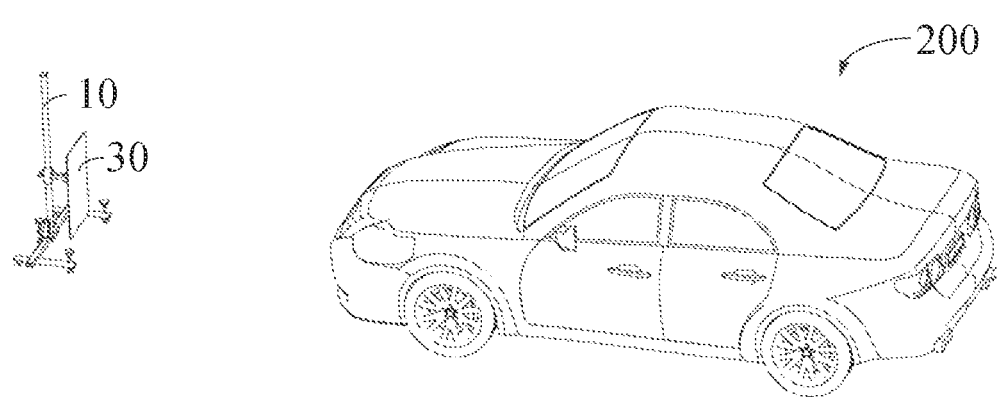
FIG. 13 shows a perspective view of the calibration device shown in FIG. 2 and a vehicle to be calibrated.

Referring to FIGS. 11 and 12, the calibration device 100 is specifically used as follows: as shown in FIGS. 1 and 12, after the calibration bracket 10 is put in place, firstly, the laser assembly 20 is attracted to the front surface of the holding part 162, and then the position of the calibration bracket 10 and the height of the loading platform 16 from the ground are adjusted so that the laser emitted by the laser assembly 20 is aimed at a sensor of the vehicle 200 to be calibrated or the vehicle to be calibrated, thereby completing the positioning of the calibration bracket 10; as shown in FIGS. 2 and 13, the laser assembly 20 is separated from the holding part 162, the laser assembly 20 is attracted to the mounting surface 1600 of the moving part 160, the calibration element 30 is mounted to the holding part 162, and the sensor of the vehicle 200 to be calibrated is calibrated by the calibration element 30.

Compared with the prior art, in the calibration device 100 provided by the embodiment of the invention, by means of the magnetic element 40, when the laser assembly 20 needs to be mounted on the loading platform 16, the laser assembly 20 only needs to approach the loading platform 16 and the laser assembly 20 will be attracted to the loading platform 16 due to the magnetic force provided by the magnetic element 40 and, when the laser assembly 20 needs to detach from the loading platform 16, the laser assembly 20 only needs to be subjected to force to overcome the magnetic force provided by the magnetic element 40 in order to separate the laser assembly 20 from the loading platform 16.

Additionally, by providing two mounting surfaces 1600, the laser assembly 20 can be put on one of the mounting surfaces 1600 after removal from the other mounting surface 1600, thereby preventing the laser assembly 20 from getting lost.

Additionally, by providing the moving channel 2260, the laser assembly 20 need not be separated from the loading platform 16 when the laser 24 needs to be turned on or off.

Finally, it should be noted that: the above embodiments are merely illustrative of the technical solution of the disclosure, and are not limiting thereto. Combinations of features in the above embodiments or between different embodiments are also possible within the spirit of the invention, the steps may be implemented in any order, and many other variations of different aspects of the invention as described above are possible, which are not provided in detail for the sake of brevity. Although the disclosure has been described in detail with reference to the foregoing embodiments, those skilled in the art will appreciate that: the technical solutions disclosed in the above-mentioned embodiments may still be modified or some of the technical features thereof may be replaced by equivalents; however, these modifications do not depart from the spirit and scope of the embodiments of the disclosure.

The invention claimed is:
1. A calibration device, comprising:
a laser assembly;
a calibration bracket, comprising a pole and a loading platform, the pole configured to support the loading platform, and the loading platform configured to support the laser assembly;
a magnetic element, mounted on one of the laser assembly and the loading platform, and configured to attact the other of the laser assembly and the loading platform, the magnetic element being disposed on a front surface, facing a vehicle to be calibrated, of the loading platform, or the magnetic element being disposed on a surface, mating with the front surface in an attractive manner, of the laser assembly;
wherein the laser assembly comprises a fixing seat and a laser; and
the fixing seat being used to be attracted to the front surface of the loading platform, and the laser being mounted to the fixing seat and used for emitting laser light.

2. The calibration device according to claim 1, wherein the pole passes through the loading platform, and the loading platform is movable along a length direction of the pole.

3. The calibration device according to claim 1, wherein the loading platform is provided with a mounting surface for attracting and receiving the laser assembly, the mounting surface being a surface of the loading platform other than the front surface.

4. The calibration device according to claim 3, wherein the mounting surface is substantially parallel to the pole.

5. The calibration device according to claim 3, wherein the loading platform is provided with a mounting groove, and the mounting surface is located in the mounting groove.

6. The calibration device according to claim 3, wherein a positioning column is projected from the mounting surface, and the laser assembly is provided with a positioning hole; and
the positioning column is received in the positioning hole when the laser assembly is attracted to and received in the mounting surface.

7. The calibration device according to claim 3, wherein two mounting surfaces are provided, and the laser assembly is configured to be attracted to and received in one of the two mounting surfaces.

8. The calibration device according to claim 1, wherein the calibration device further comprises a protection chain having one end connected to the loading platform and the other end connected to the laser assembly.

9. The calibration device according to claim 1, wherein the fixing seat is provided with a mounting cylinder, one end of the laser is configured to emit laser light, and the other end of the laser is sleeved by the mounting cylinder.

10. The calibration device according to claim 9, wherein a switch of the laser is provided at the other end of the laser; and
the switch is exposed on a surface of the fixing seat facing away from the mounting cylinder.

11. The calibration device according to claim 10, wherein the mounting cylinder is provided with a fastening screw penetrating therethrough in a radial direction to fix the other end of the laser to the mounting cylinder.

12. The calibration device according to claim 9, wherein the mounting cylinder is provided with a moving channel therein, and the moving channel has a channel bottom;
a switch of the laser is provided at the other end of the laser, and the switch is a push button; and
the other end of the laser passes through the the moving channel to be sleeved by the mounting cylinder, and the laser is movable along the moving channel so that the push button approaches or moves away from the channel bottom.

13. The calibration device according to claim 12, wherein the laser assembly further comprises a resilient member for providing a resilient force to move the push button away from the the channel bottom.

14. The calibration device according to claim 13, wherein the resilient member is a compression spring; and
two ends of the compression spring abut against the channel bottom and the other end of the laser, respectively.

15. The calibration device according to claim 14, wherein the end of the compression spring abutting against the channel bottom sleeves a bulge, the bulge being projected from the channel bottom and aligned with the push button.

16. The calibration device according to claim 12, wherein the moving channel is provided with an annular stop portion at an opening of the moving channel, the annular stop portion being smaller than the moving channel in cross-sectional dimension, and the moving channel sleeves the laser by means of the annular stop portion; and
the other end of the laser is provided with an annular limit portion projected in a radical direction thereof, the annular limit portion being larger than the laser in cross-sectional dimension.

17. The calibration device according to claim 1, wherein the magnetic element is embedded in one of the laser or the loading platform.

18. The calibration device according to claim 1, wherein one of the laser assembly and the loading platform is provided with the magnetic element, and the other of the loading platform and the laser assembly is provided with an attracting plate to be attracted by the magnetic element.

19. The calibration device according to claim 1, wherein the calibration device further comprises a calibration element; and the calibration element and the laser are alternatively mounted on the loading platform.

* * * * *